US006697487B1

(12) United States Patent
Getchell (10) Patent No.: US 6,697,487 B1
(45) Date of Patent: Feb. 24, 2004

(54) POWER CONTROL DATA DELIVERY CONSISTENCY IN COPPER PLANT

(75) Inventor: Wayne Raymond Getchell, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/312,840

(22) Filed: May 17, 1999

(51) Int. Cl.[7] .................................................. H04J 1/12
(52) U.S. Cl. ........................................ 379/417; 370/278
(58) Field of Search .................... 379/417; 370/278; 455/69

(56) References Cited

U.S. PATENT DOCUMENTS

| | | | |
|---|---|---|---|
| 4,875,205 A | | 10/1989 | Huang ............................ 370/6 |
| 5,257,390 A | | 10/1993 | Asprey ........................ 395/800 |
| 5,265,151 A | * | 11/1993 | Goldstein ................. 379/93.32 |
| 6,229,855 B1 | * | 5/2001 | Takatori et al. .............. 455/522 |

* cited by examiner

Primary Examiner—Minsun Oh Harvey
Assistant Examiner—Daniel Swerdlow
(74) Attorney, Agent, or Firm—Max R. Wood; Ogilvy Renault (57) ABSTRACT

A method and apparatus for transmit power control in a subscriber loop for high frequency data services are described. Transmit signal power levels are maintained at minimum levels for achieving acceptable communications between a transmitter and a receiver. Transmit signal power levels are adjusted dynamically on a link-by-link basis by employing command controllable transmit power attenuators at the transmitters. The transmit power attenuators are controlled by transmit signal power controllers which issue commands to the transmit power attenuators. Excess transmit power is avoided and parasitic signal coupling between communication links is reduced. The advantages are crosstalk reduction, longer loop length and higher data rates.

14 Claims, 9 Drawing Sheets

POWER CONTROL DATA DELIVERY CONSISTENCY IN COPPER PLANT

FIELD OF THE INVENTION

The present invention relates to data delivery on telecommunications links and, in particular, to an improved apparatus and method for power control data delivery for digital subscriber access to data services through the Public Switched Telephone Network (PSTN) using wire loops.

BACKGROUND OF THE INVENTION

An emerging trend in the telecommunications industry is to provide data services deployed on existing telephone twisted pair copper wires (local loops) utilizing a frequency spectrum above the voice frequency band. These services are susceptible to interference created by frequency compatible and frequency incompatible services carried in the same and/or adjacent binder groups. A binder group is a bundle of twisted pairs of copper wires bound together in a cable consisting of 12, 25, 50 or 100 such twisted pairs. Each twisted pair provides voice and/or data services to a subscriber. As high frequency services are added to a binder group, the high frequency traffic causes interference called "cross-talk" that reduces the effective loop reach and transmit capacity of data services in the cable. Consequently, loop reach and data capacity of data services using frequencies above the voice frequency band suffer from a loss in link reliability as more data service subscribers are added to a binder group.

Access to the data services is generally provided by a collection of provider transceivers at a central site connected through twisted pairs to subscriber transceivers. The twisted pairs are of various lengths due to the different location of each subscriber and the physical routing of wires. Some subscribers are near the central site while others are much farther away. Current practice has subscriber transceivers transmitting at close to maximum regulation power which is more than is generally required to maintain reliable communications with the central site at an optimum data rate, and contributes to cross-talk.

Attempts have been made at minimizing the cross-talk between the communications links described above. One proposal is for a better allocation of the frequency spectrum. Another is for implementation of power spectral density masks. Frequency coordination has been suggested as a way to control the use of the spectrum. The objective is to have different allocations for transmit and receive frequencies which prevent transmitters from occupying the receive spectrum. So far, however, there is no general agreement within the industry or regulatory bodies on frequency spectrum allocation. The power spectral density masks have been proposed but these limit the maximum transmit power in any frequency spectrum. So far there is no agreement in the industry as to the maximum transmit power permitted for many of the high frequency services currently being deployed.

There is a practical limit on the transmit signal power levels output by transceivers referred to as the "maximum transmit power". There is also a practical minimum signal-to-noise ratio for enabling clear signal detection, referred to as a "link margin". It is well known that signal attenuation occurs as a signal is carried by a twisted pair between transceivers and that attenuation increases with loop length. The quality of the loop and other components in the signal path between the subscriber transceiver and the provider transceiver also contribute to signal attenuation. Careful management of the physical facilities increases the loop reach and the reliability of communications, but it has been recognized that transmit signal power level control is required to enable a mass deployment of digital subscriber data services using a telephone network.

The current state of the art in subscriber line transmit signal power level control is described in Applicant's co-pending U.S. patent application Ser. No. 09/031,647 to Darveau filed on Feb. 27, 1998, the entire specification of which is incorporated herein by reference. Darveau teaches that the amount of cross-talk within a data transmission system in which digital data is transmitted at high speeds over a telephone network can be reduced. Darveau also teaches the use of intelligence at the remote subscriber units to reduce differences in received data signal strength at a central site, thus reducing the potential for cross-talk corruption of the data. Cross-talk is reduced by analyzing a service provider's signal received at a subscriber transceiver. All of the service provider's tranceivers transmit at a known power level. By analyzing the strength of the signal received at the subscriber tranceiver, the subscriber transceiver is enabled to determine an appropriate transmit signal power level for its transmitted signal to achieve a target signal strength at the provider tranceiver. The subscriber's transceiver transmit signal power is adjusted in coarse increments so that a data signal transmitted from the subscriber transceiver at the adjusted transmit signal power arrives at the central location at approximately the target signal strength.

Although this method has merit, it does not provide an optimal solution for reducing cross-talk between wire loops used for the delivery of high frequency data services.

As the volume and number of data services provided over twisted pair wire loops increases, transmission power management which results in more predictable and consistent data delivery rates and increased local loop reach is required.

OBJECTS OF THE INVENTION

It is therefore an object of the present invention to provide a method of transmission power management which accommodates a plurality of simultaneous communications sessions at a central site.

It is another object of the invention to provide a method of transmission power management which provides a more reliable data delivery.

It is another object of the invention to provide a method of transmission power management which enables a longer subscriber loop reach.

It is another object of the invention to provide a method of transmission power management which reduces the use of transmission power.

It is another object of the invention to provide a method of transmission power management which continuously optimizes transmission power usage.

It is yet another object of the invention to provide a method of transmission power management which optimizes transmit signal power levels based on existing connection conditions.

It is a further object of the invention to provide an apparatus for providing a data service over a twisted copper wire loop that enables a more reliable link, longer loop reach and higher transmit rates with lower bit error rates.

SUMMARY OF THE INVENTION

In accordance with the invention, there is provided a system for providing power control data delivery consistency between a central site equipped with provider transceivers and a plurality of remote subscriber transceivers located varying distances from the central site, each subscriber transceiver being connected to a provider transceiver by a wire loop, comprising:

a transmitter at each end of the wire loop, the transmitter including a transmit signal amplification stage having a command controllable transmit power attenuator;

a receiver at each end of the wire loop, the receiver including means for analyzing properties of a received signal; and,     at least one transmit signal power controller for each transceiver pair connected by a wire loop, the transmit signal power controller being adapted to receive the properties of the received signal and to control transmit power attenuation by the command controllable transmit power attenuator of a transmitter sending the received signal.

In accordance with a further aspect of the invention, there is provided a method of providing power control data delivery consistency between a central site equipped with provider transceivers and a plurality of remote subscriber transceivers, the provider transceivers and the subscriber transceivers being interconnected in pairs by a plurality of wire loops having various respective lengths, comprising the steps of:

receiving a communication signal at one of the transceivers transmitted by the other of the transceivers;

determining at least one predefined characteristic of the communication signal received;

determining from the at least one predefined characteristic whether the power level used to transmit the communication signal should be adjusted; and     issuing control commands to a command controllable transit power attenuator in the other of the transceivers to adjust the power level of the communication signal transmitted, if it is determined that the power level of the communication signal should be adjusted.

The invention therefore provides a method and apparatus for controlling transmit signal power levels in subscriber loops used for high frequency data services. Transmit signal power controllers in at least one of the provider and subscriber transceivers analyze communications signals transmitted by the other of the transceivers. The transmit signal power controllers examine a plurality of predetermined characteristics of the communication signal to ascertain whether the transmit signal power level should be adjusted. The goal is to regulate transmit signal power levels so that a minimum power for acceptable communications is dynamically maintained. Command controllable transit power attenuators are used to regulate transmit signal power levels. The command controllable transit power attenuators are preferably enabled to control transmit power outputs in small increments of 1–2 db.

Preferably, a transmit signal power controller and a command controllable transmit power attenuator are provided on each of the subscriber and provider transceivers. Proper control of transmit signal power levels reduces cross-talk within and between twisted pair binder groups, enables subscriber loop lengths to be extended and increases data transfer rates.

BRIEF DESCRIPTION OF THE DRAWINGS

The invention will now be described by way of example only, and with reference to the accompanying drawings, in which.

DESCRIPTION OF THE PREFERRED EMBODIMENTS

Figure 1:
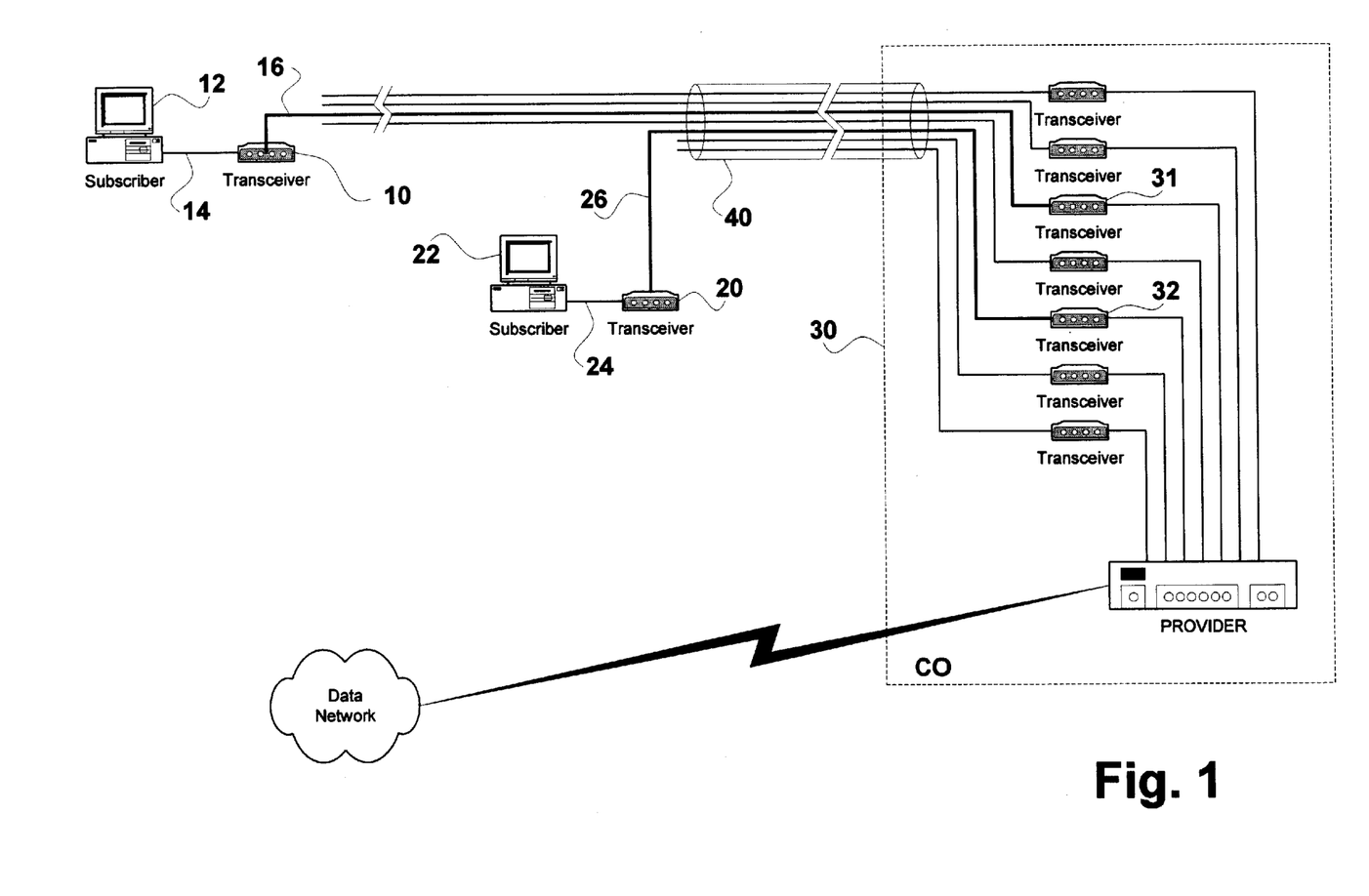
FIG. 1 is a connection diagram showing subscribers' transceivers connected to a central service site.

As shown in FIG. 1, a subscriber transceiver 10 is used by a subscriber computing system 12 located at a distance from a central site 30 to gain access to data services through a communications link, such as a twisted pair copper wire local loop 16. Similarly, another subscriber transceiver 20 is used by another subscriber computing system 22 located closer to the central site 30 to gain access to data services through another wire loop 26. Although wire loop 16 is longer than wire loop 26 both twisted pairs form part of a binder group 40. At the central site 30 the wire loops 16 and 26 are connected to provider transceivers 31 and 32, respectively.

If the subscriber transceivers 10 and 20 transmit at maximum power, then a signal power level received at the central site 30 from the subscriber transceiver 20 located close to the central site 30 will be much greater than the signal power level from the subscriber transceiver 10 located far from the central site 30.

Due to the nature of cable construction and wiring at the central site 30, signals from adjacent loops, and especially from loops in the same binder group, parasitically couple into one another. This parasitic coupling will likely have no effect on the communications link 26, because the received signal strength at the central site in the communications link 16 is relatively weak and therefore its coupling into the communication link 26 is proportionally weak. However, the strength of the signal received on the communication link 26 generally causes strong coupling into the communication link 16, which produces noise that may completely mask the transmitted signal from tranceiver 10. Such coupling can thus have an undesirable affect on the performance of the communications link 16 manifested in a reduced data transfer rate capacity and a shorter local loop reach.

Excessive signal coupling onto communications link 16 can lead to situations in which transceiver 31 synchronizes to the coupled signal from communications link 26. A process is therefore required to mitigate this situation.

Establishing a Communication Link

Figure 2:
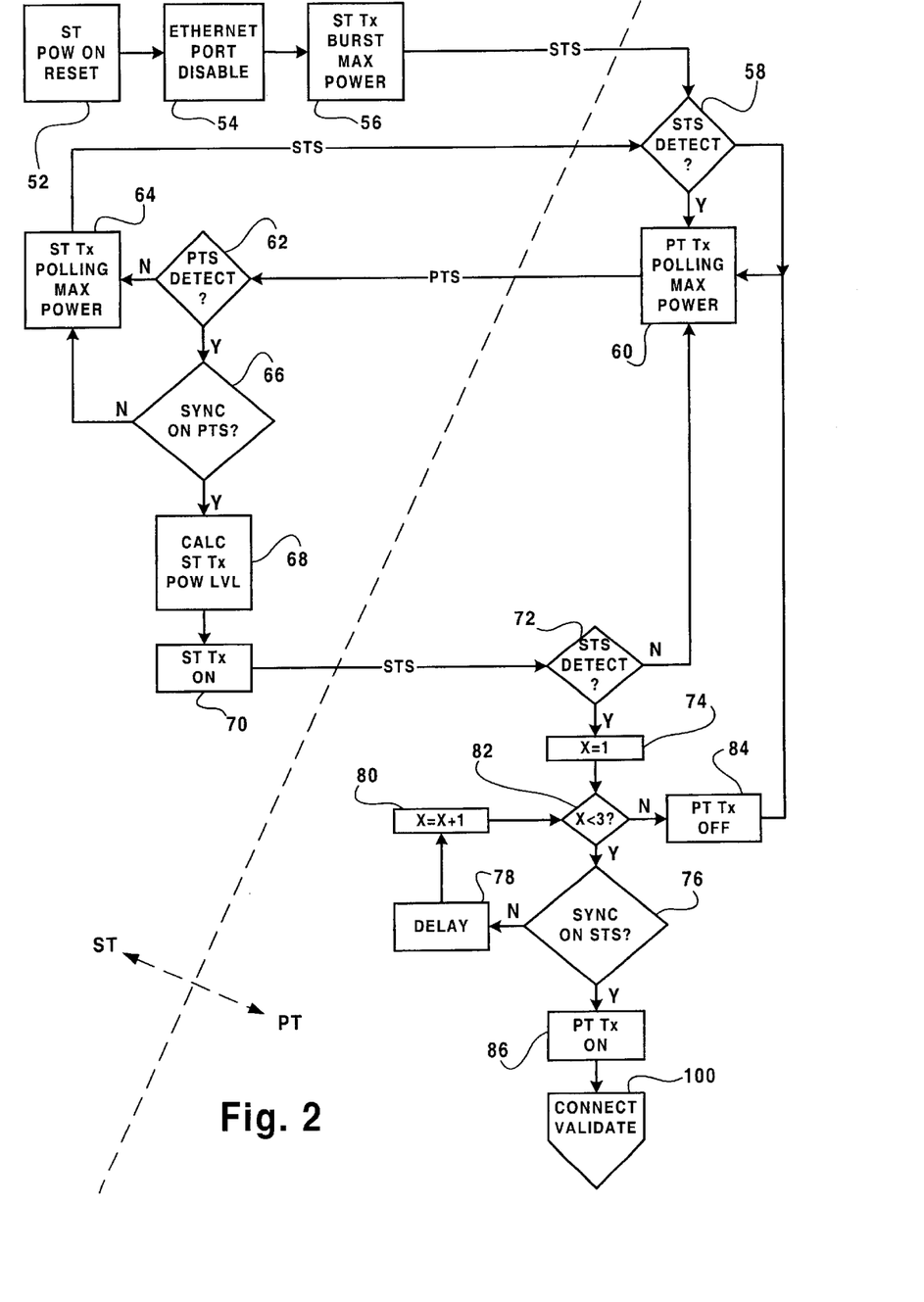
FIG. 2 is a flow diagram showing a process by which the subscriber and provider transceivers synchronize to each other's transmit signals.

Communications link setup and link validation is done on a link-by-link basis. FIG. 2 is a flow diagram showing the steps taken to setup a communications link between a Subscriber Transceiver (ST) and a Provider Transceiver (PT). Data transmitted by the ST to the PT is carried by a Subscriber Transmit Signal (STS). Data transmitted by the PT to the ST is carried by a Provider Transmit Signal (PTS).

The default state of the PT is to continuously poll the twisted pair for the ST. On power up the ST performs a power-on reset 52. A first step in the power-on reset 52 is to disable communications 54 with the subscriber's computing system. Once the ST has reset, it turns on its carrier signal providing an STS burst over the twisted pair at maximum power (56).

Detection of the STS carrier signal for 100 ms at the PT serves as an interrupt for the polling process of the PT (58). The interrupt causes the PT polling process to chirp (60) its carrier signal providing a PTS burst over the twisted pair. If the PTS carrier signal is not detected at the ST (62), the ST chirps (64) the STS providing a maximum power burst for a short period of time. Detection of the PTS carrier signal at the ST (62) triggers an attempt (66) by the ST to synchronize to the PTS carrier signal. Failure to synchronize puts the ST back into its polling state 64.

Once synchronization on PTS carrier signal is achieved, the ST assesses the received power level of the PTS carrier signal and compares it with a reference value representing the maximum transmission power level of the PTS carrier signal at the PT. Based on this comparison, the ST calculates (step 68) the attenuation over the PTS link and computes (step 70) an appropriate STS carrier transmit signal power level. On detecting the STS carrier signal at the PT (step 72), synchronization on the STS carrier is attempted in step 76. There are preferably a total of two attempts, detailed by steps 74, 76, 78, 80 and 82.

Failure to synchronize on the STS carrier signal results in turning off the PTS carrier (84) and resuming the PT polling process (step 60) after the expiry of a predetermined time interval. Synchronization on the STS carrier ends the PT polling process 60 and enables the PTS carrier signal (86). To ensure correct synchronization the PT proceeds to validate the link (100).

Connection Link Validation

Figure 3:
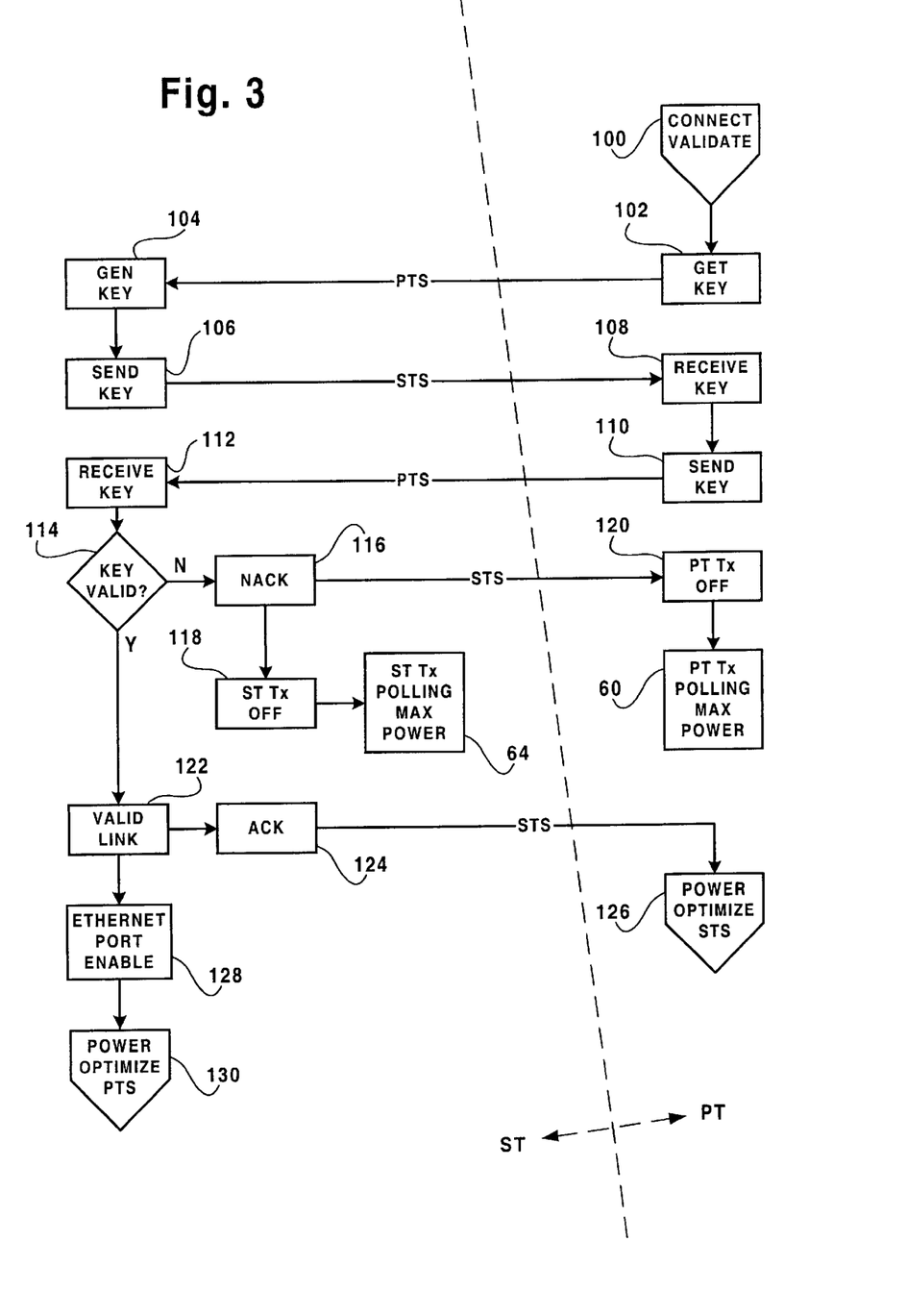
FIG. 3 is a flow diagram showing a process by which the subscriber and provider transceivers check the validity of an established connection.

As detailed in the flow diagram shown is FIG. 3, connection validation (step 100) is necessary to ensure that the PT has synchronized to the STS signal from the intended ST and not to a coupled signal propagated from an STS of another ST. To begin the validation process, the PT issues (step 102) a "get key" command over the PTS link. The receiving ST generates (step 104) a key and sends it (step 106) to the PT. On receiving the key (step 108), a PT sends the key back (step 110) over the PTS. On receiving the key (step 112), the ST validates (step 114) that the key corresponds to the key sent.

A receipt of a non-valid key turns off the STS and PTS carriers (steps 118 and 120) and initiates resumption of the polling processes (steps 60 and 64) on both the ST and PT ends. A valid key enables a valid communication link (step 122) and an ACKnowledge message (step 124) is sent to the PT. At the same time communications with the subscriber computing system is enabled at the ST (step 128).

After validating the full duplex communications link, both PTS and STS transmission power level optimization is begun.

Transmit Power Optimization Hardware—
Symmetric Implementation

In order to maintain an acceptable link margin, both the provider and subscriber transceivers are preferably enabled to transmit at variable power levels that may be controlled in small increments. Transmit power expended beyond what is necessary to maintain the link margin, is not only wasted, it may cause undesirable levels of coupling into adjacent communications links.

Preferably, transmit signal power levels are dynamically maintained at a minimum required to achieve an acceptable link margin between a subscriber transceiver and a provider transceiver. Consequently, excess transmit power is avoided and the parasitic coupling between communications links is reduced.

Figure 4:
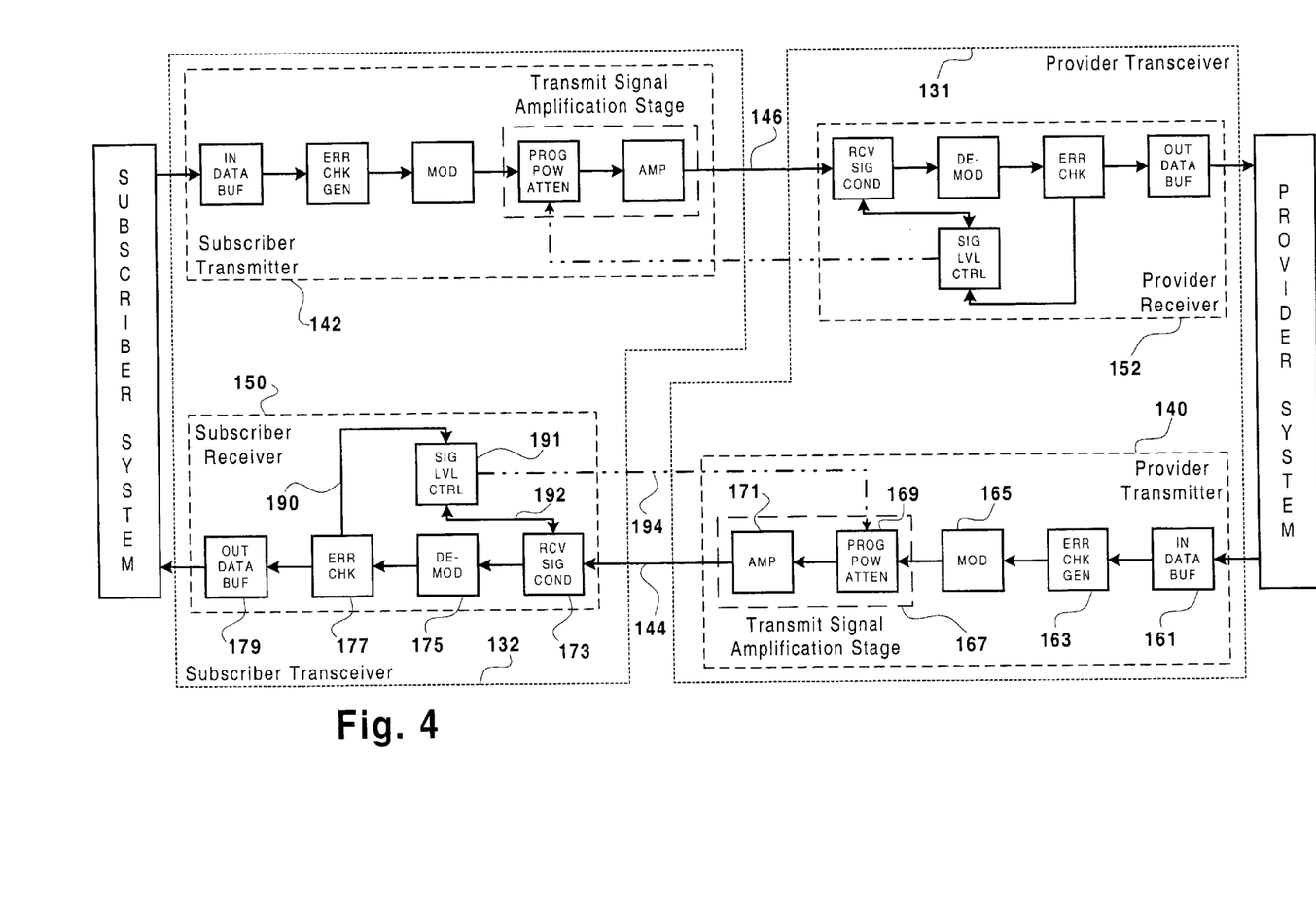
FIG. 4 is a functional block diagram showing a subscriber's transceiver connected to a provider's transceiver, in which transmit power control in accordance with the invention is enabled on each of the subscriber and provider transceivers.

In a preferred implementation shown in FIG. 4, a full duplex communication link is set up between an ST 132 and a PT 131. Each transceiver includes a transmitter and a receiver, as is well known in the art. To establish the full duplex communication link between the transceivers 132 and 131, the provider transmitter 140 is linked to the subscriber receiver 150, and the subscriber transmitter 142 is linked to the provider receiver 152. The full duplex communications link between the transceivers 132 and 131 is enabled by a unidirectional PTS 144 and STS 146.

In describing the end-to-end PTS 144 it should be understood that similar components make up the end-to-end STS 146 because the implementation is symmetric.

When a subscriber launches an information request, a data stream is provided by the data service provider system. The data stream is buffered in an input data buffer 161. Data packets from the input data buffer are passed to an error check generator 163 which appends error checking bits to the data packets, forming augmented data packets. The augmented data packets are processed by a modulator 165 which outputs a transmit signal. This transmit signal is passed to a transmit signal amplification stage 167. Under higher control 194, the amplitude of the transmit signal is controlled by a command controllable transmit power attenuator 169. An attenuated transmit signal output by the command controllable transmit power attenuator 169 is amplified by a signal driver 171 which outputs the communications signal corresponding to the PTS 144.

The communications signal carried by the PTS 144 is received at a received signal conditioning stage 173. Besides signal manipulation operations well known to a person skilled in the art, received signal information 192 about the received signal, such as background noise level and signal level, is extracted from the received PTS. The received signal is then demodulated by demodulator 175 into received augmented data packets and passed to an error checking stage 177. Error checking information 190 about the signal is extracted from the received augmented data packets and in the process, error bearing received data packets are discarded. Error free data packets are passed to an output data buffer 179 which provides the subscriber system with a data stream.

The higher level control required to enable the present invention is provided by a transmit signal power controller 191. The transmit signal power controller 191 accepts as input the received signal information 192 and the error checking information 190. The information may include, but is not limited to: the number of dropped data packets or bit error rate, background noise level, received signal level, signal-to-noise ratio etc. Using this information, the transmit signal power controller 191 computes a transmit signal power level and may optionally compute a received signal detection threshold level. A received signal detection threshold adjustment, if required, is communicated to the received signal conditioning stage 173 in order to keep the signal detection threshold above the background noise level. If required, a transmit signal power level adjustment is communicated to the command controllable transmit power attenuator 169 over the STS in order to keep the link margin of the PTS within acceptable limits. Preferably, the command controllable transmit power attenuator may be controlled in increments of 1–2 db.

In the preferred implementation there is one transmit signal power controller 191 per transceiver, and each controller is closely related to the receiver circuitry from which signal information 190 and 192 is received. Transmit signal power level adjustment commands are issued to the respective command controllable transmit power attenuators 169 of the PTS 144 and STS 146 via dedicated communications channels. FIG. 4 shows the communications channel 194 between the transmit signal power controller 191 of the subscriber receiver 150 and the command controllable transmit power attenuator 169 of the provider transmitter 140. The communications channels are themselves unidirectional and are multiplexed with the transmitted signals in a manner well known to persons skilled in the art. Specifically, in the preferred embodiment the communications channel 194 is multiplexed on the STS 146.

Transmit Power Optimization Process—Symmetric Implementation

Transmit power optimization of the Subscriber Transmit Signal is performed repetitively in a program loop which dynamically computes transmit signal power level adjustments. The algorithms described below deal exclusively with transmit signal power level control. Persons skilled in the art will realize that it may be necessary to control data transfer speeds as well as transmit signal power levels. In order to enable a concise description of the invention, the control of data transfer speed is not described, although it may be incorporated into any of the algorithms described below.

Figure 5:
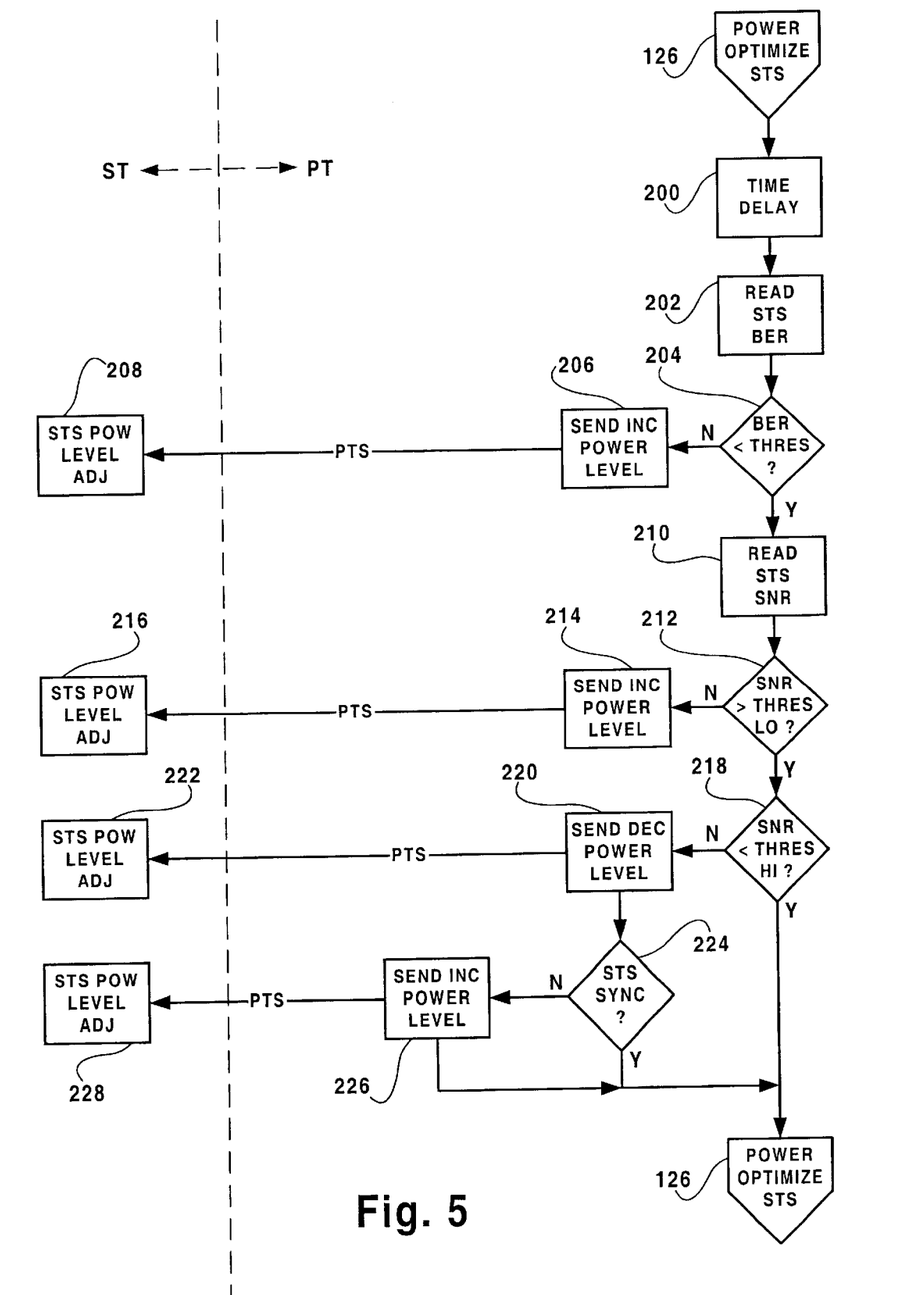
FIG. 5 is a flow diagram showing a process by which the provider transceiver optimizes the transmit signal power level of the subscriber transceiver according to an embodiment of the invention in which transmit power control is enabled on each of the subscriber and provider transceivers.

FIG. 5 shows a flow diagram of a first optimization loop 126. After a predetermined time delay 200, the provider transceiver takes a reading of the subscriber transmitted signal bit error rate 202. The time delay is preferably variable and may be influenced by several factors including transmission speed and bit error rate, the implementation being largely a matter of design choice. If the bit error rate exceeds a predetermined threshold, step 204, the provider transceiver sends a transmit signal power level increment message, step 206, over the provider transmit signal to the subscriber transceiver. The subscriber transceiver 132 adjusts the subscriber transmit signal power level accordingly, step 208. Although not illustrated, it is to be understood that before the transmit signal power level is adjusted, a check is performed to ascertain if the transmit signal power level is already at maximum, in which case, the request is ignored. If the bit error rate is determined to be below the threshold in step 204, then the provider transceiver reads the received signal information (signal-to-noise ratio of the subscriber transmit signal, for example) in step 210. If the signal-to-noise ratio does not exceed a predetermined lower threshold, step 212, the provider transceiver sends a transmit signal power level increment message request, step 214, over the provider transmitter signal to the subscriber transceiver, and the subscriber transceiver adjusts the transmit signal power level of the subscriber transmit signal accordingly, step 216. If the signal-to-noise ratio does exceed the lower threshold, another comparison is made to determine if the signal-to-noise ratio exceeds an upper threshold, step 218. If so, the provider transceiver sends a transmit signal power level decrease message request, step 220, over the provider transmit signal to the subscriber transceiver. The subscriber transceiver adjusts the transmit signal power level of the subscriber transmit signal accordingly, step 222. On the provider transceiver side, the transmit signal power level decrease message request, step 220, triggers synchronization monitoring, step 224. If synchronization on the subscriber transmit signal is lost, the provider transceiver sends a power level increase request message over the provider transmit signal, step 226, to the subscriber transceiver, which reacts accordingly by increasing the transmit signal power level by the requested increment, step 228. If the synchronization is maintained, then the power optimization loop of the subscriber transmit signal returns to step 126.

Figure 6:
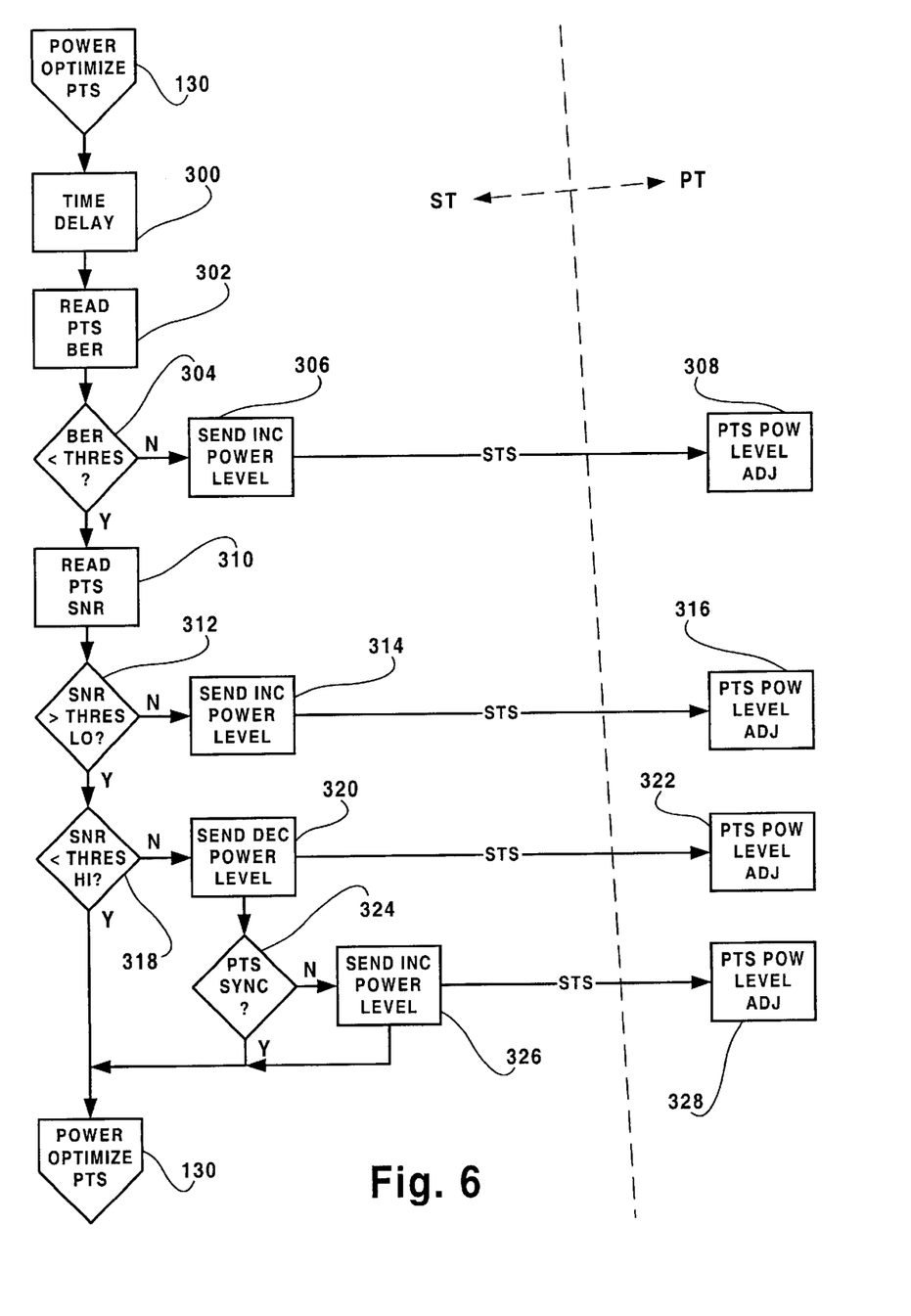
FIG. 6 is a flow diagram showing a process by which the subscriber transceiver optimizes the transmit signal power level of the provider transceiver according to an embodiment of the invention in which transmit power control is enabled on each of the subscriber and provider transceivers.

FIG. 6 shows a flow diagram of a process performed by the subscriber transceiver 132 to optimize the transmit signal power level of the provider transmit signal 144. After a predetermined time delay (300) determined in the same way as described above, the subscriber transceiver takes a reading of the bit error rate of the provider transmit signal, step 302. A determination is made (step 304) by the subscriber transceiver of whether the bit error rate exceeds a predetermined threshold. If the bit error rate exceeds the threshold, a transmit signal power level increase message request is sent in step 306 over the subscriber transmit signal to the provider transceiver 131. The provider transceiver responds by adjusting the transmit signal power level of the provider transmit signal accordingly, step 308. If the bit error rate is below the threshold, then the subscriber transceiver examines the transmit signal information (signal-to-noise ratio, for example), of the received provider transmit signal, step 310. If the signal-to-noise ratio is below a lower threshold, step 312, the subscriber transceiver sends a transmit signal power level increase message request, step 314, over the subscriber transmit signal to the provider transceiver. The provider transceiver responds by adjusting the transmit signal power level of the provider transmit signal in step 316. If the signal-to-noise ratio is above the lower threshold, in step 312 the subscriber transceiver further determines whether the signal-to-noise ratio is below an upper threshold, step 318. If the upper threshold is exceeded, the subscriber transceiver sends a transmit signal power level decrease message request, step 320, over the subscriber transmit signal. The provider transceiver responds by adjusting the transmit signal power level of the provider transmit signal accordingly, step 322. On the subscriber transceiver side, the transmit signal power level decrease message request also invokes a synchronization check, step 324. If synchronization on the provider transmit signal is lost, then the subscriber transceiver sends a transmit signal power level increase message request over the subscriber transmit signal, step 326. The provider transceiver adjusts the transmit signal power level of the provider transmit signal accordingly, step 328. If synchronization is maintained, power reduction of the provider transmit signal has been achieved and the transmit power optimization loop of the provider transmit signal returns to step 130.

Alternate Implementation

Figure 7:
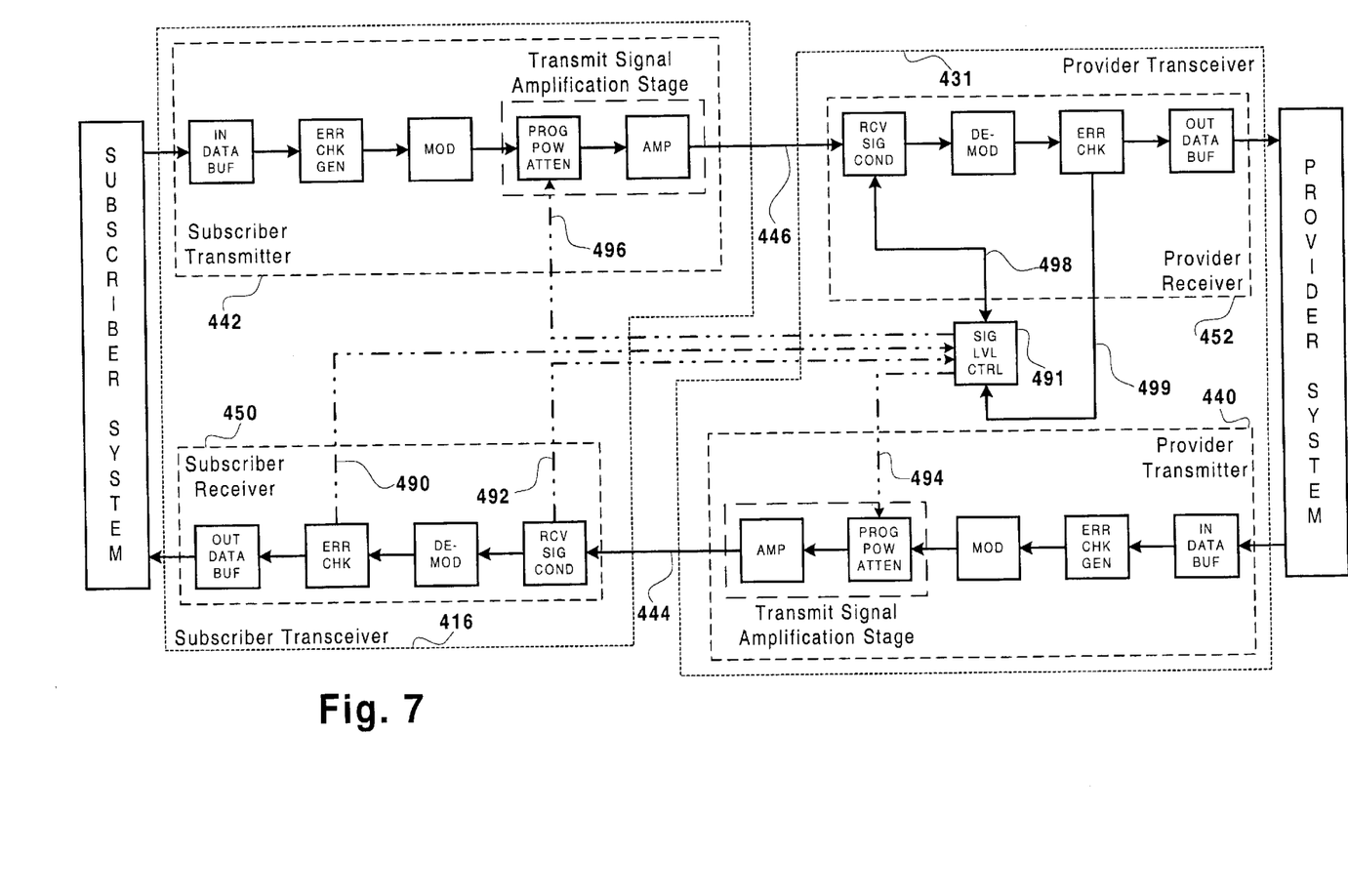
FIG. 7 is a functional block diagram showing a subscriber's transceiver connected to a provider's transceiver, in which transmit power control in accordance with the invention is enabled on the provider's transceiver.

An alternate implementation employs a centralized transmit signal power controller which is part of the provider transceiver 431 or the subscriber transceiver 416. As seen in the embodiment shown in FIG. 7, signal information 490, 492, 498 and 499 about both PTS 444 and STS 446 is fed into transmit signal power controller 491 and computed transmit signal power levels are communicated through communications channel 496 to the subscriber transmitter 442 and through communications channel 494 to the provider transmitter 440.

If only the provider transceiver is enabled to perform transmit power optimization, a transmit power optimization loop optimizes the transmit signal power levels of both the subscriber transmit signal and the provider transmit signal.

Figure 8:
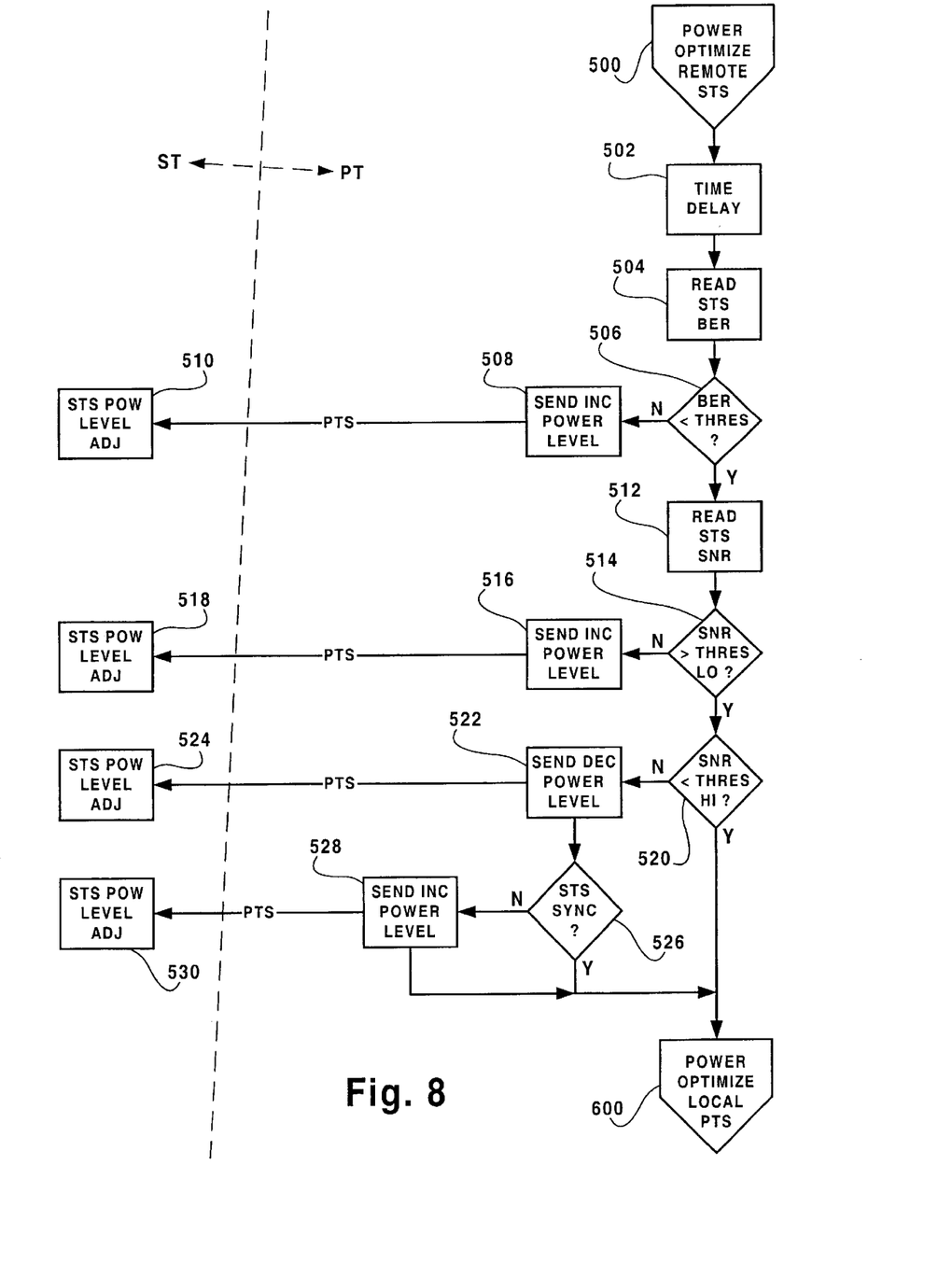
FIG. 8 is a flow diagram showing a process by which the provider transceiver optimizes the transmit signal power level of the subscriber transceiver according to an embodiment in which transmit power control is enabled on the provider transceiver.

Remote transmit power optimization of the subscriber transmit signal is shown in FIG. 8, the steps of which are similar to those shown in FIG. 5. The difference is that after remote transmit power optimization of the subscriber transmit signal is performed, local transmit power optimization of the provider transmit signal is also performed, step 600.

Figure 9:
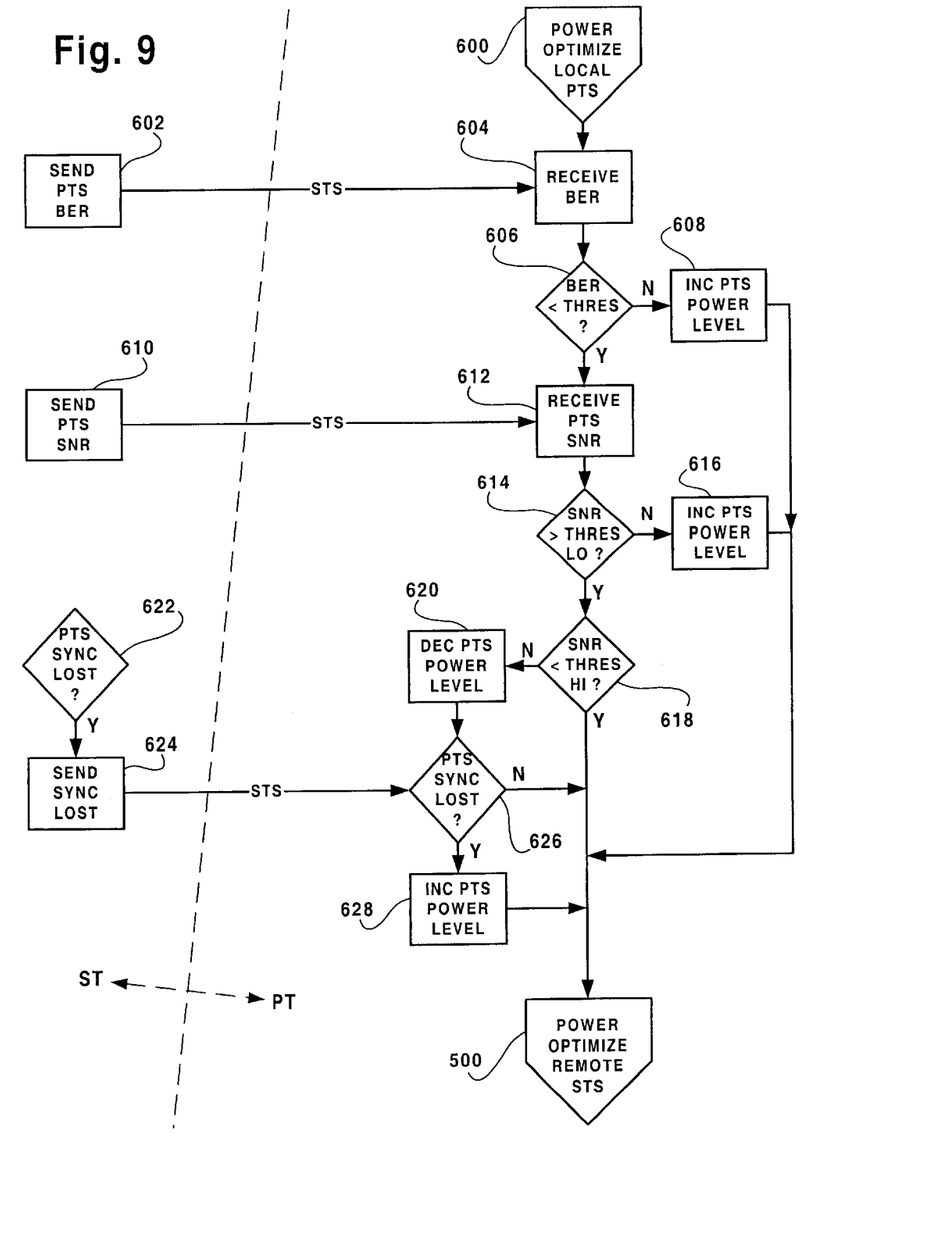
FIG. 9 is a flow diagram showing a process by which the provider transceiver optimizes its own transmit signal power level according to an embodiment in which transmit power control is enabled on the provider transceiver.

FIG. 9 shows the local transmit power optimization of the provider transmit signal by the provider transceiver. At regular intervals, the subscriber transceiver sends the bit error rate of the provider transmit signal to the transmit signal power controller 491 (FIG. 7), step 602. Upon receiving the bit error rate in step 604, the transmit signal power controller 491 determines whether the bit error rate exceeds a predetermined threshold. If so, the transmit signal power controller 491 increments the transmit signal power level of the provider transmit signal, step 608. The subscriber transceiver periodically sends received signal information, such as the signal-to-noise ratio of the provider transmit signal, step 610 to the transmit signal level controller 491. On receiving the signal-to-noise ratio in step 612, the transmit signal power controller determines whether the signal-to-noise ratio exceeds a lower threshold, step 614. If not, the transmit signal power controller 491 increments the transmit signal power level of the provider transmit signal in step 616. Further, if the signal-to-noise ratio exceeds the upper threshold, step 618, the transmit signal power controller 491 decreases the transmit signal power level of the provider transmit signal, step 620. If the power level of the provider transmit signal is decreased, that action triggers a synchronization check, step 626. If the subscriber transceiver determines that synchronization was lost on the provider transmit signal in step 622, it sends a synchronization lost message in step 624, to the transmit signal power controller 491. On receiving a synchronization lost message, the transmit signal power controller sends an appropriate command to the command controllable transmit power attenuator to increase the transmit signal power level of the provider transmit signal, step 628. Having thus optimized the transmit signal power level of the provider transmit signal, the loop restarts at step 500 (FIG. 8).

The Bit Error Rate

The bit error rate of the received transmit signals described above is accumulated on a continuous basis using a sliding window type analysis that is well known in the art. This type of bit error accumulation provides for a historical trend in the variation of the transmission quality. Preferably, after each power level adjustment of the transmit signal power level, the accumulated bit error rate is re-initialized, as is the sliding window. The bit error rate threshold discussed above is preferably a ratio of about $10^{-6}$. To facilitate processing, a table may be used to store a maximum number of bit errors for each given transmission speed. The bit error rate threshold test therefore becomes a simple matter of comparing the accumulated bit errors with a value obtained in a lookup table indexed by data transmission speed.

Signal-to-Noise Ratio Thresholds

As described above, the power attenuation range of about 40 db is preferably enabled in the provider and subscriber transmitters. The transmit power attenuators are preferably controllable in 1–2 db increments, and under normal operating conditions, the transmit signal power level is not adjusted by more that ±1–2 bd in any power level adjustment. A suitable link margin is about 6 db over noise level on the link. The low threshold and the high threshold for the signal-to-noise threshold tests described above are therefore preferably offset about equally on respective sides of the preferred 6 db link margin. By reducing the transmit power of all transmitters at both the central site and subscriber sites, so that only as much transmit power is utilized as is required to meet the link margin, parasitic signal coupling is reduced. This enables longer loop reach, faster data transfer speeds, and data delivery consistency. Constant monitoring of the transmit signal power levels enables dynamic adaptive response to unpredictable environmental electromagnetic noise events that could otherwise interrupt a communications link.

The preferred embodiments of the invention described above are intended to be only exemplary of the invention and are not intended in a limiting sense. The scope of the invention is therefore intended to be limited solely by the scope of the appended claims.

I claim:

1. A system for providing power control data delivery consistency between a central site equipped with provider transceivers and a plurality of remote subscriber transceivers located varying distances from the central site, each subscriber transceiver being connected to a provider transceiver by a wire loop, comprising:

a transmitter at each end of the wire loop, the transmitter including a transmit signal amplification stage having a command controllable transmit power attenuator;

a receiver at each end of the wire loop, the receiver including means for analyzing properties of a received signal; and, a single transmit signal power controller for each transceiver pair connected by a wire loop, the single transmit signal power controller being adapted to receive the properties of the signal received by each of the transceivers in the transceiver pairs and to control transmit power attenuation by the command controllable transmit power attenuator of the respective transmitters sending the received signal, wherein said transmit power attenuator can be controlled in 1–2 db increments and provides a 40 db range of control.

2. A system as claimed in claim 1, wherein said wire loop provides a communications link that is partitioned into a data channel and a control channel, and the one transmit signal power controller receives the properties of the respective received signals via the control channel and sends commands to of the respective command controllable transmit power attenuators via the control channel.

3. A system as claimed in claim 1, wherein the means for analyzing the received signal comprises a received signal conditioning circuit which measures at least a signal-to-noise ratio of the signal and a data error checking circuit that measures at least bit error rate of data received in the received signal.

4. A system as claimed in claim 1, wherein the wire loop is a twisted copper wire pair.

5. A method of providing power control data delivery consistency between a central site equipped with provider transceivers and a plurality of remote subscriber transceivers, the provider transceivers and the subscriber transceivers being interconnected in pairs by a plurality of wire loop links having various respective lengths, comprising the steps of:

receiving a communications signal at each of the transceivers transmitted by the other of the transceivers;

determining at the respective transceivers at least one predefined characteristic of the communication signals received and forwarding the at least one signal characteristic to a single signal transmit power controller that resides on only one of the provider and subscriber transceivers;

determining from the at least one predefined characteristic of each received signal whether the power level used to transmit the respective communication signals should be adjusted; and issuing control commands from the transmit signal power controller to each command controllable transmit power attenuator to adjust the power level of the respective communications signals in 1–2 db increments over a 40 db range of control when the respective communications signals are determined to require a power level adjustment.

6. A method as claimed in claim 5, wherein the step of determining at least one predefined characteristic of the communication signal received comprises:

extracting a background noise level and a signal level from the signal received; and computing a bit error rate for data sent in the signal received.

7. A method as claimed in claim 6, wherein the step of determining whether the power level used to transmit the communications signal requires adjustment comprises:

examining the bit error rate to determine whether it exceeds a predefined threshold, and determining that the transmit signal power level should be increased if the bit error rate exceeds the predetermined threshold.

8. A method as claimed in claim 6, wherein the step of determining whether the power level used to transmit the communications signal requires adjustment comprises:

examining the background noise level and the signal level of the signal received and determining that the transmit signal power level should be increased if a difference between the background noise level and the signal level is less than a predetermined lower threshold.

9. A method as claimed in claim 8, wherein the step of determining whether the power level used to transmit -the communications signal requires adjustment comprises:

examining the background noise level and the signal level of the signal received and determining that the transmit signal power level should be decreased if a difference between the background noise level and the signal level is greater than a predetermined upper threshold.

10. A method as claimed in claim 5, wherein the transmit signal power controller issues the power control commands to the other of the provider and subscriber transceivers using a control channel on the communications link.

11. A method as claimed in claim 5, wherein the one transmit signal power controller receives the at least one predefined characteristic of the power level used to transmit the communication signal from the other of the provider and subscriber transceivers via a command channel on the communications link.

12. A method as claimed in claim 5, wherein the one transmit signal power controller receives the at least one predefined characteristic of the power level used to transmit the communications signal from the one of the provider and subscriber transceivers on which it resides via an internal bus.

13. Apparatus for providing power control data delivery consistency between a central site equipped with provider transceivers and a plurality of remote subscriber transceivers located varying distances from the central site, the subscriber transceivers being connected to the provider transceivers by wire loops, comprising in combination:

a subscriber transceiver at a subscriber end of each wire loop, the subscriber transceiver including a transmit signal amplification stage having a command controllable transmit power attenuator, and a receiver including means for analyzing properties of a received signal;

a provider transceiver at a provider end of each wire loop, the provider transceiver including a transmit signal amplification stage having a command controllable transmit power attenuator, and a receiver including means for analyzing properties of a received signal; and a single transmit signal power controller for each transceiver pair connected by a communications link, the transmit signal power controller being adapted to receive the properties of each received signal and to control transmit power attenuation by the respective command controllable transmit power attenuators of a transmitter sending the received signal.

14. A method of providing power control data delivery consistency between a central site equipped with provider transceivers and a plurality of remote subscriber transceivers located at varying distances from the central site, the provider transceivers and the subscriber transceivers being interconnected in pairs by a plurality of wire loops having various respective lengths, comprising steps of:

a) receiving a communication signal at a provider transceiver transmitted by a subscriber transceiver;

b) determining at the provider transceiver at least one predefined characteristic of the communication signal received, and passing the at least one predefined characteristic to a transmit signal power controller;

c) determining at the transmit signal power controller using the at least one predefined characteristic whether the power level used to transmit the communication signal from the subscriber transceiver should be adjusted because an error bit rate associated with the signal is too high, or a signal strength over noise is not within a predefined range;

d) issuing control commands to a command controllable power attenuator in the subscriber transceiver to adjust a power level of the communication signal transmitted in 1–2 db increments over a 40 db range of control, if it is determined that the power level of the communication signal should be adjusted;

e) adjusting the transmit signal power level of the transmit power attenuator of the subscriber transceiver on receipt of the control commands;

f) receiving a communication signal at a subscriber transceiver transmitted by a provider transceiver;

g) determining at the subscriber transceiver at least one predefined characteristic of the communication signal received, and passing the at least one predefined characteristic to a transmit signal power controller;

h) determining at the transmit signal power controller using the at least one predefined characteristic whether the power level used to transmit the communication signal from the provider transceiver should be adjusted because a bit error rate associated with the signal is too high, or a signal strength over noise is not within a predefined range;

i) issuing control commands to a command controllable power attenuator in the provider transceiver to adjust a power level of the communication signal transmitted in 1–2 db increments over a 40 db range of control, if it is determined that the power level of the communication signal should be adjusted; and j) adjusting the transmit signal power level of the transmit power attenuator of the provider transceiver on receipt of the control commands.

* * * * *